3,743,683
OXIDATIVE DEHYDROGENATION PROCESS

Louis J. Croce, Seabrook, Tex., and Laimonis Bajars, Princeton, and Maigonis Gabliks, Highland Park, N.J., assignors to Petro-Tex Chemical Corporation, Houston, Tex.
No Drawing. Continuation-in-part of application Ser. No. 459,878, May 28, 1965. This application June 11, 1970, Ser. No. 45,556
Int. Cl. C07c 5/18
U.S. Cl. 260—680                                                        10 Claims

ABSTRACT OF THE DISCLOSURE

Improved oxidative dehydrogenation catalysts can be prepared by modifying metal ferrite oxidative dehydrogenation catalysts with titanium or zirconium. For example, a promoting amount of zirconium oxide, 10%, can be added to manganese ferrite. The improvement may be in conversion, selectivity or yield or in temperature of operation.

---

This application is a continuation-in-part of our application Ser. No. 459,878 filed May 28, 1965 and entitled Chemical Process.

The present invention relates to the oxidative dehydrogenation of organic compounds over ferrite catalyst wherein the oxidative dehydrogenation system is modified by the presence of a promoting amount of titanium and/or zirconium.

Oxidative dehydrogenations employing ferrite catalysts are known. U.S. Pats. 3,270,080; 3,284,536; 3,303,234; 3,303,235, 3,303,236; 3,303,238; 3,308,182; 3,324,195; 3,334,152; 3,342,890; 3,398,100 and 3,450,787 disclose such processes.

Briefly stated the present invention is in a process for the oxidative dehydrogenation of organic compounds in the presence of a metal ferrite catalyst wherein the improvement is in the incorporation of a member selected from the group consisting of titanium, zirconium, or mixtures thereof, hereafter referred to as the modifier. Although excellent results have been obtained with many of the catalysts described in the prior art, it is an object of this invention to provide further improved catalysts.

One of the primary objects in catalyst development is to produce more active catalysts which still have selectivity. Generally higher yields per pass can be obtained by more active catalysts. Hower, even if the absolute yield is not increased, it is an important advantage of a more active catalyst that the process can be operated at a lower reaction temperature.

Other advantages of this invention are possible, e.g. high selectivities and conversions. Also it is possible to obtain a higher percentage utilization of oxygen for the dehydrogenation reaction and to obtain high conversions and selectivities at relatively low ratios of oxygen to organic compound. Still another feature of this process is that it is not necessary to use excessive ratios of steam to organic compound to produce a given yield. These and other objects will become obvious from the following description of the invention.

The catalyst modifier may be added to the metal ferrite by any suitable method. Generally the modifier will be added at such time that there will be intimate mixing with the other ingredients. If a catalyst carrier is employed, one convenient method is to form a slurry of the modifier with the metal ferrite prior to coating on the carrier. The modifier may also be precipitated or dry-mixed. Although aqueous mediums will generally be used it is contemplated that non-aqueous system can be employed in the preparation of the modified catalyst. It would generally appear to be preferable if the modifier is added to the preformed metal ferrite rather than incorporating the modifier with the ferrite precursor prior to forming the ferrites.

The modifier is added to the catalysts in a catalytic promoting amount. Generally a catalytic promoting amount for the defined modifiers will be not more than about twenty-five percent by weight based on the total weight of active catalysts components. For purpose of calcination the weight of a catalyst carrier, if any, is not considered in determining the percent of modifier. Suitable weight percentages are from .005 to 25%, but a preferred range is from .005 to 15% calculated as the elements Ti or Zr based on the weight of ferrite plus any uncombined iron oxide.

The modifiers described can be employed in the form of the elemental metal or a metal compound. Often a soluble form of metal compound will be employed. Both organic and inorganic compounds can be used. The elemental metals and organic compounds are usually changed to inorganic compounds thereof, at least on the surface, under the reaction conditions set forth herein. Particularly effective are inorganic compounds such as the oxides and salts including the phosphates, sulfates, phosphites, sulfites, silicates, thiocyanates, thiosulfates and the like. Examples of suitable starting compounds as modifiers are $TiO_2$, $Ti_2O_3$, $Ti_2(C_2O_4)_3 \cdot 10H_2O$, $5TiO_2 \cdot N_2O_5 \cdot 6H_2O$, $ZrO_2$, $Zr(OH)_4$, $ZrCl_4$ and the like.

The catalysts to be modified contain iron, oxygen and at least one or other metallic element Me other than Ti or Zr. In this application and claims Me is defined to exclude Ti or Zr and it is understood that Me can represent one or more than one of the defined metal elements. The catalysts comprise crystalline compositions of iron, oxygen, and at least one other metallic element Me. The catalysts comprise ferrites other than Periodic Table Group IV–B (Ti, Zr or Hf) ferrites. Ordinarily, the ionic radius of the second metallic ingredient(s) Me is small enough that the oxygen anions are not spread too far apart. That is, the elements must be able to form a crystalline structure with the iron and oxygen.

A preferred type of catalyst of this type is that having a face-centered cubic form of crystalline structure. Examples of this type of catalyst are ferrites of the general formula $MeO \cdot Fe_2O_3$ where Me is a divalent metal cation such as $Mg^{++}$ or $Ni^{++}$. However, if the cations are large, such as $Sr^{++}$ (1.35 A.), the spinel structure may not occur and other types of ferrites having a hexagonal crystal of the type $SrO \cdot 6Fe_2O_3$ may be formed. These hexagonal ferrites are within the scope of the definition of catalysts of this invention.

Suitable catalysts may also be ferrites wherein other metals are partially substituted for the iron. For example, atoms having a valence of +3 may be partially substituted for some of the $Fe^{+++}$ atoms. Also, metal atoms having a valence of +4 may replace some of the $Fe^{+++}$ ions. However, the catalysts will suitably have iron present in an amount described above in relation to the total atoms of the second metallic ingredient(s).

The catalyst may have the iron combined in crystalline structure with oxygen and more than one other metallic element, as mentioned above. For example, a preferred type of ferrite is that essentially or approximately of the formula, $MeFe_2O_4$, where Me represents a divalent metal ion with an ionic radius approximately between 0.5 and 1.1 A., preferably between about 0.6 and 1.0 A. In the case of simple ferrites, Me may be, e.g. one of the divalent ions of the transition elements as Mg, Ca, Sr, Ba, Cr, Mn, Co, Ni, Zn, or Cd, however, a combination of these ions is also possible to form a ferrite such as $Ni_{0.5}Mg_{0.5}Fe_2O_4$ or $Ni_{0.25}Mg_{0.75}Fe_2O_4$. Moreover, the symbol Me may represent a combination of ions which have an average valency of two. However, it is essential that the crystalline structure contain iron and the metallic element other than iron. Suitable catalysts to be modified e.g. are those having the formula $Me_aFe_bO_x$ with $a$ being from 0.1 to 3, $b$ being from 0.1 to 3 or 13 and $x$ being the oxygen required to satisfy the unfilled valences and will preferably be about 4 but may be from or about 3 to 19 inclusive.

Examples of catalysts are such as magnesium ferrite, cobalt ferrite, nickel ferrite, zinc ferrite, barium ferrite, manganese ferrite, calcium ferrite, cadmium ferrite, strontium ferrite, and rare earth ferrites such as cerium ferrite or mixtures of ferrites, such as ferrites containing iron combined with at least one element selected from the group consisting of Mg, Zn, Ni, Co, Mn, Cu, Cd, Ca, Ba, Sr, Al, Cr, V, Mo, W, Na, Li, K, Sn, Pb, Sb, Bi, Ga, Ce, La, Th, other rare earth elements and mixtures thereof, with a preferred group being Mg, Ca, Sr, Ba, Mn, Cr, Co, Ni, Zn, Cd, and mixtures thereof. Examples of mixed ferrites are magnesium ferrite plus zinc ferrite, magnesium ferrite plus nickel ferrite, magnesium ferrite plus cobalt ferrite, magnesium ferrite plus nickel ferrite plus zinc ferrite, magnesium ferrite plus manganese ferrite. As explained above, these ferrites may be physical mixtures of the ferrites or may contain crystals wherein the different metallic atoms are contained in the same crystal, or a combination of physical mixtures and chemical combinations. Some examples of a chemical combination would be magnesium zinc ferrite, magnesium chromium ferrite, zinc chromium ferrite and lanthanum chromium ferrite.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the $Fe^{+++}$ state. Some ferrites are described in Ferromagnetism, by Richard M. Bozorth (D. Van Nostrand Co., Inc., 1951), which disclosure is hereby incorporated by reference.

Although the catalysts may be broadly defined as containing crystalline structures of iron, oxygen and the second metallic ingredient(s), certain types of catalysts are preferred. Valuable catalysts were produced comprising as the main active constituent in the catalyst surface exposed to the reaction gases, iron, oxygen and at least one element selected from the group of Mn, or Periodic Table Groups II-A, II-B, or VIII such as those selected from the group consisting of magnesium, manganese, calcium, cadmium, cobalt, zinc, nickel, barium, strontium, and mixtures thereof. The Periodic Table referred to is the one on pages 400–401 of the Handbook of Chemistry and Physics (39th edition, 1957–58, Chemical Rubber Publishing Co., Cleveland, Ohio). Preferred catalysts have iron present as the predominant metal in the catalyst exposed in the reaction gases.

Ferrite formation may be accomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, manganese carbonate may be reacted with iron oxide hydrates to form manganese ferrite. Salts of the desired metals may be coprecipitated and the precipitate heated to form the ferrite. Desired ferrites may be obtained by conducting the reaction to form the ferrite at relatively low temperatures, that is, at temperatures lower than some of the very high temperatures used for the formation of some of the semiconductor applications. Good results, e.g., have been obtained by heating the ingredients to a temperature high enough to produce the required ferrite but at conditions no more severe than equivalent to heating at 950° C. or 1000° C. for 90 minutes in air and generally the maximum temperature will be less than 1300° C. and preferably less than 1150° C. Methods for preparing catalysts suitable for this invention are disclosed in U.S. Pats. 3,270,080; 3,284,536; 3,303,234–6; 3,303,238; 3,308,182; 3,334,152; 3,420,912; 3,440,299; 3,342,890 and 3,450,787 and these disclosures are hereby incorporated by reference.

The compositions of this invention may also comprise additives, such as disclosed in U.S. 3,270,080 and U.S. 3,303,238. Phosphorus, silicon, boron, sulfur or mixtures thereof are examples of additives. Excellent catalysts may contain less than 5 weight percent, and preferably less than 2 weight percent, of sodium or potassium in the surface of the catalyst.

Carriers or supports for the catalyst may be employed such as alumina, pumice, silica and so forth. Diluents and binders may also be used. Unless stated otherwise, the compositions referred to in this application are the main active constituents of the dehydrogenation process during dehydrogenation and any ratios and percentages refer to the surface of the catalyst in contact with the gaseous phase during dehydrogenation.

The catalysts may be activated or regenerated by reducing with a reducing gas, e.g., such as hydrogen or hydrocarbons. For example, the preformed compositions may be reduced with, e.g., hydrogen at a temperature of at least 250° C. with the temperature of reduction generally being no greater than 850° C. The period of time for reduction will be dependent somewhat on the temperature of reduction.

The process of this invention may be applied to the dehydrogenation of a wide variety of organic compounds. Such compounds normally will contain from 2 to 20 carbon atoms, at least one

grouping, a boiling point below about 350° C., and such compounds may contain other elements, in addition to carbon and hydrogen such as oxygen, halogens, nitrogen and sulfur. Preferred are compounds having 2 to 12 carbon atoms, and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile; propionaldehyde to acrolein; ethyl chloride to vinyl chloride; methyl isobutyrate to methyl methacrylate; 2 or 3 chlorobutene-1 or 2,3-dichlorobutane to chloroprene; ethyl pyridine to vinyl pyridine; ethylbenzene to styrene; isopropylbenzene to α-methyl styrene; ethylcyclohexane to styrene; cyclohexane to benzene; ethane to ethylene or acetylene; propane to propylene, methyl acetylene, allene, or benzene; isobutane to isobutylene; n-butane to butene and butadiene-1,3; a mixture of n-butane and n-butene to n-butene and butadiene; n-butene to butadiene-1,3 and vinyl acetylene; methyl butene to isoprene; cyclopentane to cyclopentene and cyclopentadiene-1,3; n-octane to ethyl benzene and ortho-xylene; monomethylheptanes to xylenes; ethyl acetate to vinyl acetate; methyl isobutyrate to methyl methacrylate; 2,4,4-trimethylpentane to xylenes; and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3-dichlorobutane, 1,4-dichlorobutane, the chlorofluoroethanes, methyl pentane, methylethyl ketone, diethyl ketone, n-butyl alcohol, methyl propionate, and the like.

Suitable dehydrogenation reactions are the following: acyclic compounds having 4 to 5 non-quarternary contiguous carbon atoms to the corresponding olefins, diolefins or acetylenes having the same number of carbon atoms; aliphatic hydrocarbons having 6 to 16 carbon atoms and at least one quarternary carbon atoms to aromatic compounds, such as 2,4,4-trimethylpentene-1 to a mixture of xylenes; acyclic compounds having 6 to 16 carbon atoms and no quarternary carbon atoms to aromatic compounds such as n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The prefered compounds to be dehydrogenated are hydrocarbons with a particularly preferred class being acyclic non-quarternary hydrocarbons having 4 to 5 contiguous carbon atoms or ethyl benzene and the preferred products are n-butene-1 or 2, butadiene-1,3 vinyl acetylene, 2-methyl-1-butene, 3-methyl-1-butene, 3-methyl-2-butene, isoprene, styrene or mixtures thereof. A preferred hydrocarbon feed would be selected from the group of propane, n-butane, n-butene, pentane or pentene (both including all isomers) and mixtures thereof. Especially preferred as feed are n-butene-1 or 2 and the methyl butenes and mixtures thereof such as hydrocarbon mixtures containing these compounds in at least 50 mol percent.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The organic compound to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents, and so forth. Oxygen may also be added in increments to the dehydrogenation zone. The oxygen may be supplied in a cyclic manner such as described in U.S. 3,420,911. Although determinations regarding the mechanism of reaction are difficult, the process of this invention is an oxidative dehydrogenation process wherein the predominant mechanism of this invention is by the reaction of oxygen with the hydrogen released from the hydrocarbon.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor) in the dehydrogenation zone in an amount from about 0.2 to 1.5, preferably 0.3 to 1.2, mols per mol of $H_2$ being liberated from the organic compound. Ordinarily the mols of oxygen supplied will be in the range of from .2 to 2.0 mols per mole of organic compound to be dehydrogenated and for most dehydrogenations this will be within the range of .25 to 1.5 mols of oxygen per mol of organic compound.

Preferably, the reaction mixture contains a quantity of steam or diluent such as nitrogen with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. Diluents generally may be used in the same quantities as specified for the steam. These gases serve also to reduce the partial pressure of the organic compound.

It is one of the advantages of this invention that halogen may also be present in the reaction gases to give excellent results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, methyl chloride, 1,2-dibromo ethane cycloaliphatic halides, ammonium iodide, ammonium bromide; ammonium chloride, sulfuryl chloride; metal halides including molten halides; and the like. The halogen may be liberated partially or entirely by a solid source as disclosed in the process of U.S. 3,130,241 issued Apr. 21, 1964. Mixtures of various sources of halogen may be used. The amount of halogen, calculated as elemental halogen, may be as little as about 0.0001 or less mol of halogen per mol of the organic compound to be dehydrogenated to as high as 0.2 or 0.5.

The temperature for the dehydrogenation reaction generally will be at least about 250° C., such as greater than about 300° C. or 375° C., and the maximum temperature in the reactor may be about 700° C. or 800° C. or perhaps higher such as 900° C. under certain circumstances. However, excellent results are obtained within the range of or about 350° C. to 700° C., such as from or about 400° C. to or about 675° C. The temperatures are measured at the maximum temperature in the dehydrogenation zone.

The gaseous reactants may be conducted through the reaction chamber at a fairly wide range of flow rates. The optimum flow rate will dependent upon such variables as the temperature of reaction, pressure, particle size, whether a fluid bed is utilized and so forth. Desirable flow rates may be established by one skilled in the art. Generally the flow rates will be within the range of about 0.10 to 10 or 15 liquid volumes of the organic compound to be dehydrogenated per volume of dehydrogenation zone containing catalyst per hour (referred to as LHSV). Usually, the LHSV will be between 0.15 and about 5. For calculation, the volume of a fixed bed dehydrogenation zone containing catalyst is that original void volume of reactor space containing catalyst.

The process of this invention utilizes either a fixed bed or moving bed, such as a fluidized catalyst reactor. Reactors which have been used for the dehydrogenation of hydrocarbons by non-oxidative dehydrogenation are satisfactory such as the reactors for the dehydrogenation of n-butene to butadiene-1,3.

The following examples are only illustrative of the invention and are not intended to limit the invention. All percentages are weight percent unless specified otherwise. All conversions, selectivities and yields are expressed in mol percent of the designated feed.

EXAMPLE 1

Barium ferrite (Columbian Carbon Co. EG-4) modified with zirconium is used as the catalyst. The barium ferrite has about 12 atoms of iron per atom of barium. One percent by weight $Zr(OH)_4$, calculated as Zr, based on the weight of the barium ferrite is intimately mixed with the barium ferrite. The barium ferrite composition is then coated on 4 to 8 mesh fused alumina pellets in an amount of roughly 30 percent by weight catalyst composition based on the total weight. n-Butane is dehydrogenated at atmospheric pressure in a Vycor glass reactor (36" x 1" O.D.) having a 50 cc. catalyst bed supported on a 1" deep layer of ¼" x ¼" O.D. Vycor Raschig rings. n-Butane, oxygen and steam and HBr are introduced into an adapter located on top of the glass reactor, and the effluent gases are passed through a cold-water condenser to remove most of the steam. The product is analyzed in a vapor chromatograph. The n-butane used is C.P. grade, 99.0 mol percent minimum; the oxygen is commercial grade, purity 99.5 plus, and steam is generated from the distilled water.

The mixture of n-butane, oxygen, HBr and steam is fed to the reactor in an amount of 1.25 mols of oxygen, 20 mols of steam and 0.08 mol of bromine per mol of n-butane (calculated as $Br_2$). The LHSV is 0.2. At a maximum temperature in the reactor of 510° C. a high yield of butadiene-1,3 is obtained.

EXAMPLES 2–13

Examples 2 to 13 in Tables I, II and III illustrate the promoting and stabilizing effect of titanium and zirconium on magnesium ferrite either as compounds such as $TiO_2$ or as titanates or zirconates. It is noted that the control run rapidly drops in activity as compared to the modified catalysts.

TABLE I

| Example | Modifier | Molar ratio steam/O₂/butene-2 | Hours | LHSV | 400° C. | 450° C. | 500° C. | 550° C. | 600° C. |
|---|---|---|---|---|---|---|---|---|---|
| | | | | | Conversion/selectivity/yield, butadiene (mol percent) | | | | |
| 2 | None—control | 20/0.6/1.0 | Initial | 1.0 | 43/96/41 | 61/94/57 | 73/92/68 | 67/90/60 | 50/86/43 |
| 3 | do | 20/0.6/1.0 | 6 hrs | 1.0 | 13/85/11 | 36/82/29 | 42/80/34 | 49/84/41 | 60/87/52 |
| 4 | 10% TiO₂ | 20/0.6/1.0 | Initial | 1.0 | 49/97/47 | 72/94/68 | 72/94/68 | 67/92/62 | |
| 5 | 10% TiO₂ | 20/0.6/1.0 | 5 hrs | 1.0 | 54/89/48 | 60/90/54 | 62/90/56 | 63/90/57 | |
| 6 | 10% Mg titanate | 20/0.6/1.0 | Initial | 1.0 | 61/96/59 | | 78/92/72 | | |
| 7 | 10% Ce titanate | 20/0.6/1.0 | do | 1.0 | 65/95/62 | 71/94/67 | 76/93/71 | 73/91/66 | |
| 8 | do | 20/0.6/1.0 | 5 hrs | 1.0 | 59/87/51 | 71/87/62 | 69/87/60 | | |
| 9 | 10% Ce zirconate | 20/0.6/1.0 | Initial | 1.0 | | 73/92/68 | | | |
| 10 | do | 20/0.6/1.0 | 6½ hrs | 1.0 | | 68/91/62 | | | |

TABLE II

| Example | Catalyst | Molar ratio Steam/O₂/butene-2 | LHSV | 400° C. | 450° C. | 500° C. | 500° C. | 600° C. |
|---|---|---|---|---|---|---|---|---|
| | | | | Conversion/selectivity/yield | | | | |
| 11 | Zinc ferrite | 30/.6/1.0 | 1.0 | | | 63/91/57 | 56/89/50 | |
| 12 | Zinc ferrite plus 10% Zn titanate | 20/.6/1.0 | 1.0 | | 76/94/71 | 79/92/73 | | |

TABLE III

| Example | Catalyst | Molar ratio Steam/O₂/butene-2 | LHSV | Conversion/selectivity/yield |
|---|---|---|---|---|
| 13 | Manganese ferrite plus ZrO₂[1] | [2] 30/.9/1.0 | 1.5 | At 950° F. conversion=57%, Selectity=90% |

[1] 70.3 grams manganese ferrite plus .0371 mols of ZrO₂.
[2] Feed 88% 2-methylbutene-2; 8% 2-methylbutene-1.

We claim:

1. A process for the oxidative dehydrogenation of hydrocarbons having at least 4 carbon atoms and at least one

grouping which comprises contacting said hydrocarbon with a metal ferrite catalyst wherein the metal of said ferrite is selected from the group consisting of Mg, Ca, Sr, Ba, Mn, Cr, Co, Ni, Zn, Cd and mixtures thereof, the improvement comprising modifying the said metal ferrite catalyst with titanium in an amount calculated as the element of from .005 to 25 weight percent based on the total weight of said metal ferrite and any uncombined iron oxide in the said catalyst.

2. The process of claim 1 wherein the metal ferrite catalyst is barium ferrite.

3. The process of claim 1 wherein the metal ferrite catalyst is magnesium ferrite.

4. The process of claim 1 wherein the metal ferrite catalyst is zinc ferrite.

5. The process of claim 1 wherein the metal ferrite catalyst is manganese ferrite.

6. The process of claim 1 wherein the said hydrocarbon is selected from the group consisting of n-butene and methyl butene.

7. The process of claim 1 wherein the said oxidative dehydrogenation is conducted in the presence of a halogen.

8. The process of claim 1 wherein the titanium is present in an amount calculated as the element of from .005 to 15 weight percent.

9. The process of claim 1 wherein the titanium is added to the metal ferrite after the metal ferrite has been formed.

10. A process for the oxidative dehydrogenation of acyclic non-quaternary hydrocarbons having 4 to 5 contiguous carbon atoms and at least one $$\begin{array}{c} \text{H} \;\; \text{H} \\ | \;\; | \\ -\text{C}-\text{C}- \\ | \;\; | \end{array}$$

grouping which comprises contacting said hydrocarbon with a metal ferrite catalyst comprising a member selected from the group consisting of magnesium ferrite, barium ferrite, zinc ferrite and manganese ferrite, and mixtures thereof, the improvement comprising modifying the said metal ferrite catalyst with a member selected from the group consisting of titanium, zirconium and mixtures thereof in an amount calculated as the element of from .005 to 25 weight percent based on the total weight of said metal ferrite and any uncombined iron oxide in the said catalyst.

References Cited

UNITED STATES PATENTS

| | | | |
|---|---|---|---|
| 3,450,788 | 6/1969 | Kehl et al. | 260—680 |
| 3,450,789 | 6/1969 | Kehl et al. | 260—680 |
| 3,270,080 | 8/1966 | Christmann | 260—680 |
| 3,303,238 | 2/1967 | Christmann | 260—680 |
| 3,409,697 | 11/1968 | Callahan et al. | 260—680 |

PAUL M. COUGHLAN, JR., Primary Examiner

U.S. Cl. X.R.

252—472; 260—680 D, 683.3

UNITED STATES PATENT OFFICE
CERTIFICATE OF CORRECTION

Patent No. 3,743,683  Dated  July 3, 1973

Inventor(s) Louis J. Croce et al.

It is certified that error appears in the above-identified patent and that said Letters Patent are hereby corrected as shown below:

Column 2, line 9, "calcination" should read -- calculation --; line 29, "one or other" should read -- one other --. Column 6, line 51, "will dependent" should read -- will be dependent --.

Signed and sealed this 5th day of March 1974.

(SEAL)
Attest:

EDWARD M. FLETCHER, JR.
Attesting Officer

C. MARSHALL DANN
Commissioner of Patents